March 29, 1949.  H. S. WHEELER  2,465,621

TARPAULIN ANCHOR

Filed May 27, 1946

INVENTOR.
HARRISON S. WHEELER
BY
Charles M. Fryer
ATTORNEY.

Patented Mar. 29, 1949

2,465,621

UNITED STATES PATENT OFFICE 2,465,621

TARPAULIN ANCHOR

Harrison S. Wheeler, Sacramento, Calif.

Application May 27, 1946, Serial No. 672,348

4 Claims. (Cl. 248—361)

1

The present invention relates to tarpaulin anchors or to devices for anchoring or securing the edges of a tarpaulin for holding it in place over goods to be protected from the weather.

It is common practice to employ canvas tarpaulins for covering a cargo on a truck while it is in transit for the purpose of protecting the cargo from the weather and particularly from moisture. The tarpaulin usually consists of a large sheet of canvas like material provided with grommets or similar devices along its edges through which a cord may be passed for lacing it to the body of the truck. The lacing is preferably tight to hold the tarpaulin securely against the effect of wind. However, variations in humidity caused by rain and dew and even the difference in atmospheric conditions between day and night cause the tarpaulin to shrink and stretch. Thus, though it is desirable that the tarpaulin be applied in a taut condition, it is usually allowed sufficient slack to permit shrinkage and to prevent its being split or torn when the shrinkage occurs. Maintaining a tarpaulin sufficiently taut to prevent flapping and tearing in the wind and also allowing enough slack to permit shrinkage without splitting is quite difficult and consumes much of the time of truck drivers who must frequently stop the truck to investigate and to make necessary adjustments.

It is an object of the present invention to provide a tarpaulin anchor which may be used on trucks or the like for securing the tarpaulin in a manner to overcome the difficulties above mentioned. A further object of the invention is the provision of a tarpaulin anchor capable of being easily applied to a truck and which, though simple and durable in construction, will provide a resilient securing means easily attached and detached from the tarpaulin for maintaining it taut notwithstanding the differences in its size caused by shrinkage and stretching. Further and more specific objects and advantages of the invention are made apparent in the following specification wherein reference is made to the accompanying drawings for a detailed description thereof.

2

Figure 2:
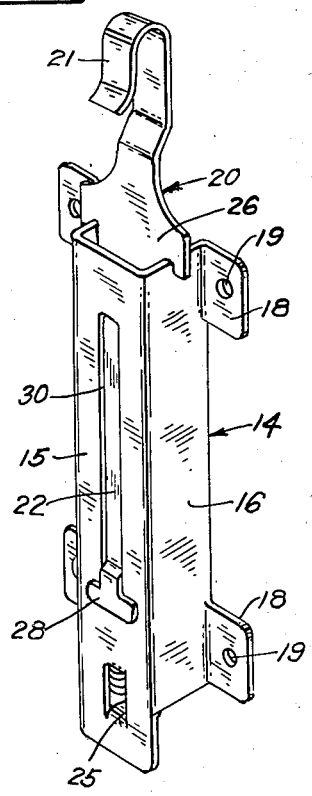
Fig. 2 is a perspective view of one of the anchors illustrated in Fig. 1.
Figure 3:
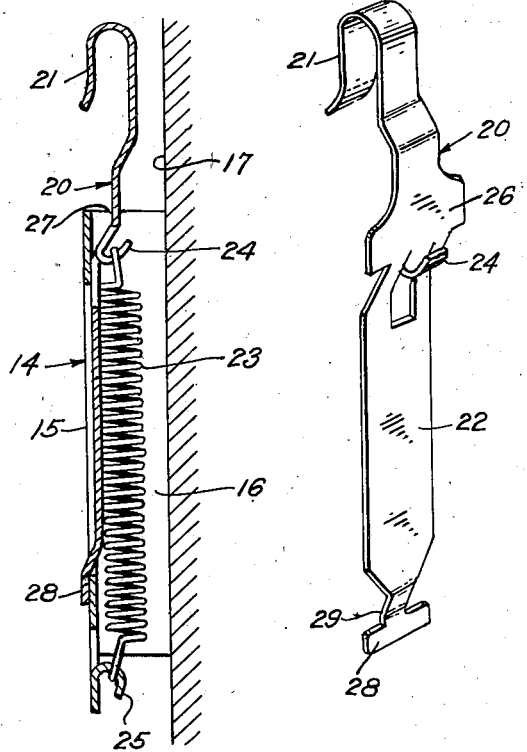
Fig. 3 is a vertical transverse sectional view through the tarpaulin anchor shown in Fig. 2.
Figure 4:
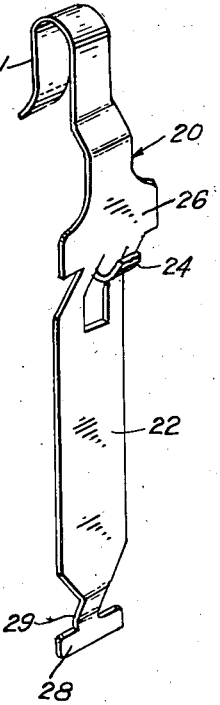

Fig. 4 is a perspective view of one part of the anchor shown in Figs. 2 and 3.

Figure 1:
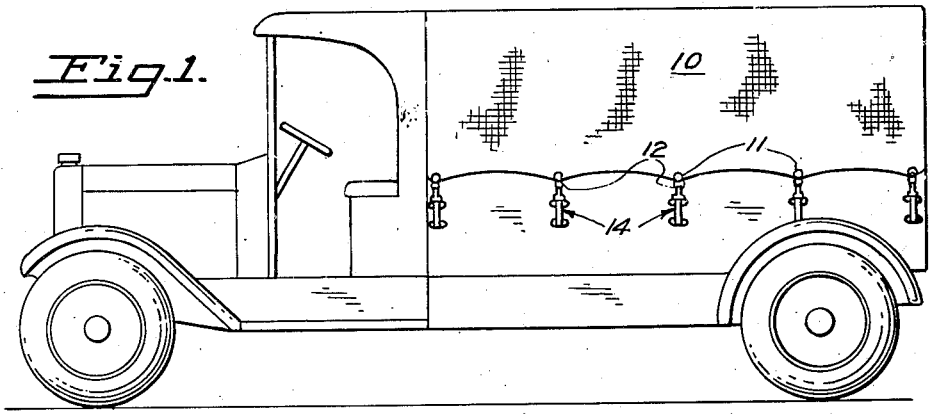
Fig. 1 is a view in side elevation of a truck covered by a tarpaulin which is secured in place by anchors which embody the present invention.

In Fig. 1 of the drawings a truck is shown as having its cargo covered by a tarpaulin illustrated at 10 which has grommets 11 formed at spaced intervals along its edges and which is connected preferably by cords of rope 12 with tarpaulin anchors generally indicated at 14 which are secured to the side boards of the truck. Each of the tarpaulin anchors 14 comprises as shown in Figs. 2 and 3 an elongated rectangular housing of channel shaped cross section which includes a back wall 15 and side walls 16. This housing is open at its top and bottom ends and when it is applied to the side board of a truck a portion of which is indicated at 17 in Fig. 3 it provides an elongated rectangular closure open at its opposite ends. Wings 18 are bent outwardly at right angles to the side wall 16 and have perforations 19 through which screws, bolts, or other securing means may be passed for securing the housing in place against the side wall of the truck. A hook member generally indicated at 20 and best illustrated in Fig. 4 is disposed with its hooked end 21 projecting from the upper end of the housing and is arranged for longitudinal sliding movement with relation to the housing. The lower portion of the hooked member 20 is formed as a flat bar as shown at 22 which is slideably fitted in the housing and a tension spring 23 extends between an anchor 24 on the hook member and a similar anchor 25 on the wall 15 of the housing. Both of the anchors 24 and 25 are preferably formed by punching out and bending a portion of the metal of which the hook and housing are made. The spring is of a size to be slightly stretched or pre-loaded to hold the hook member in a retracted position with relation to the housing. The hook is provided with a cross member 26 engageable in notches 27 formed in the upper edges of the side walls 16 of the housing to prevent it from rattling when it is not in use. The lowermost end of the hook member is provided with a transverse bar 28 connected with the guide portion 22 by a neck portion 29 of reduced width which is offset to dispose the cross bar 28 in a plane slightly behind that of the portion 22. When the hook is inserted in the housing, the neck portion 29 extends through a slot 30 in the back wall 15 so that the bar portion 28 is disposed exteriorly of the housing and serves by engagement with the upper end of the slot 30 to prevent the hook member from being entirely withdrawn from the housing when it is in its extended position.

In use the tarpaulin anchors constructed in the manner hereinabove described are secured to the side boards of the truck in spaced relation substantially like the spacing of the grommets in the tarpaulin. The grommets may be slipped directly over the hooked end 21 of the hooked member but preferably the cords 12 are employed to form a connection between the grommets and the hooked ends. In applying the cords they are drawn sufficiently tight to place the springs 23 under sufficient tension and to partially withdraw the hook members from the housing 14. When a tarpaulin is applied in this manner the tension on the springs 23 is sufficient to maintain the tarpaulin taut enough to prevent its flapping in the wind. The resilience of the springs, however, will give way to shrinkage of the tarpaulin so that it is not in danger of being split when such shrinkage occur. If, on the other hand, the tarpaulin stretches after it has been applied, the springs will retract sufficiently to accommodate the difference in its size which results from stretching and it will not become loose over the load which it is protecting.

The portion 22 of the hook member guides it in its sliding movement in the housing 15. This same portion 22 is disposed in sliding contact with the inside of the back face 15 of the housing and as the spring is disposed behind this guiding portion, it tends to hold it in its proper position. Furthermore, the spring holds the entire hook in alignment when it is not in use so that when the cross member 26 becomes engaged in the notches 27 the hooks are relatively rigidly arranged to prevent rattling and wear which might otherwise take place.

The tarpaulin anchor herein disclosed is of simple and inexpensive construction and may easily be applied to trucks or other places where it is desired to secure the edges of a tarpaulin. Its use entirely eliminates the hazards and difficulties which are met in the use of tarpaulins secured by conventional means.

I claim:

1. A resilient anchor for tarpaulins or the like which comprises a channel-shaped housing adapted to be secured against a flat surface, a hook member having a flat portion slidable against an inner side of the housing, said housing side having a slot, and a portion on the hook member deformed to extend through said slot to limit the sliding movement of the hook.

2. A resilient anchor for tarpaulins or the like which comprises a channel-shaped housing adapted to be secured against a flat surface, a hook member having a flat portion slidable against an inner side of the housing, said housing side having a slot, and a portion on the hook member deformed to extend through said slot to limit the sliding movement of the hook, and resilient means contained by the housing and acting between the hook and the housing to retract the hook.

3. A resilient anchor for tarpaulins or the like comprising an open ended housing adapted to be secured against a surface, a hook having an extended portion slidable in said housing, said hook and extended portion being shaped from a piece of flat metal deformed and having lateral projections engageable with the edges of an open end of the housing to prevent retraction of the hook portion into the housing, and a spring contained by the housing and engaged between the hook and the housing to urge the hook toward a retracted position.

4. A resilient anchor for tarpaulins or the like comprising an open ended housing having a flat wall and adapted to be secured against a surface, a hook having a flat extension slidable in the housing and bearing on said flat wall, and a spring connected with the hook and the housing and disposed between the hook extension and said surface to urge the hook to a retracted position.

HARRISON S. WHEELER.

REFERENCES CITED

The following references are of record in the file of this patent:

UNITED STATES PATENTS

| Number | Name | Date |
|---|---|---|
| 422,238 | Lundborg | Feb. 25, 1890 |
| 1,158,247 | Lindblom | Oct. 26, 1915 |
| 1,182,702 | Niles | May 9, 1916 |